Feb. 9, 1943.   H. P. PHILLIPS   2,310,311
PISTON RING ASSEMBLY
Filed Jan. 20, 1940
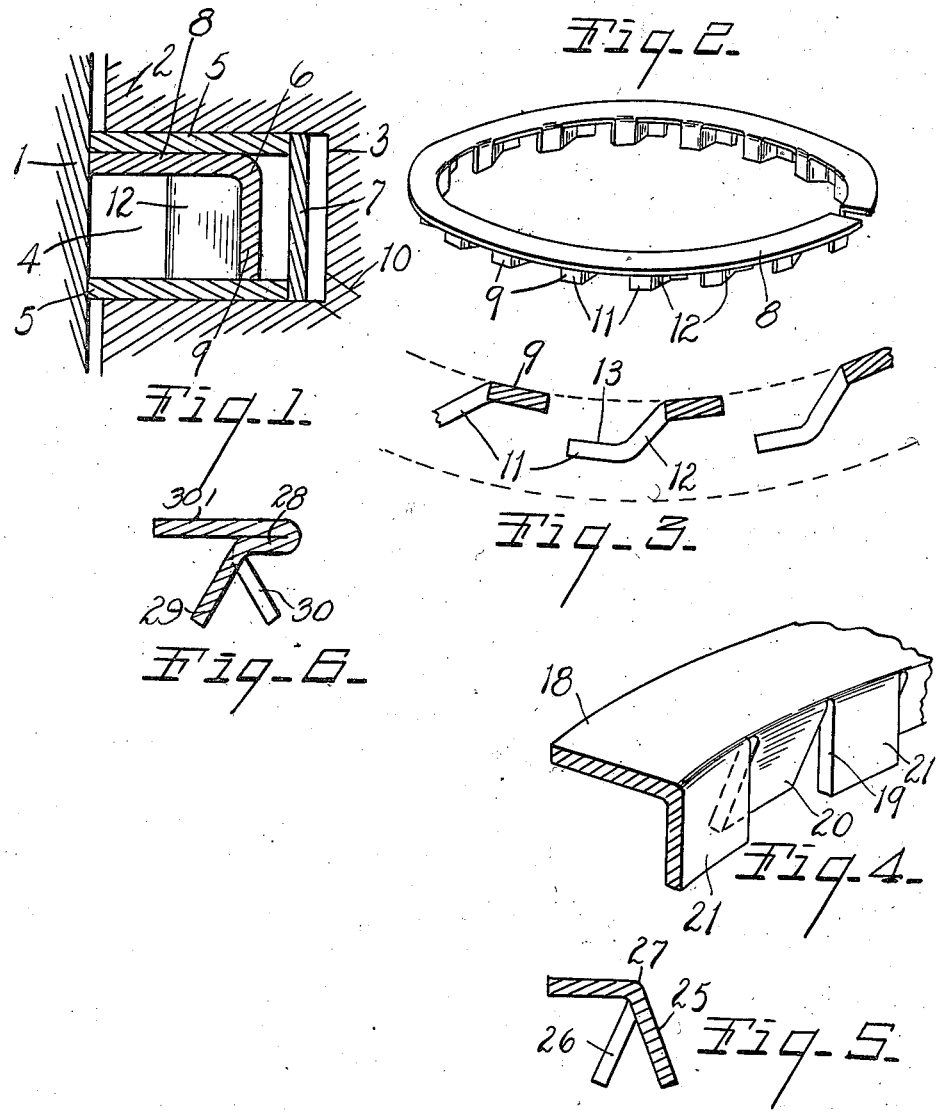
INVENTOR.
Harold P. Phillips
BY Earl D. Chappell
ATTORNEYS Patented Feb. 9, 1943

2,310,311

UNITED STATES PATENT OFFICE 2,310,311

PISTON RING ASSEMBLY

Harold P. Phillips, Hastings, Mich., assignor to Hastings Manufacturing Company, Hastings, Mich., a corporation of Michigan Application January 20, 1940, Serial No. 314,745

7 Claims. (Cl. 309—44)

This invention relates to improvements in piston ring assemblies.

The main objects of this invention are:

First, to provide a novel composite piston ring which is resistant to breakage in handling and installation and which can be very economically produced.

Second, to provide a piston ring assembly including one or more cylinder wall engaging and sealing elements and a spacer therefor of a novel and improved construction.

Third, to provide an improved spacer element for a piston ring assembly embodying a pair of cylinder wall engaging elements located in a piston groove on opposite sides of the spacer.

Fourth, to provide a spacer of the type described which is of strip or sheet metal construction conformed to be stably supported in assembled relation to the other elements of the assembly in a piston groove.

Fifth, to provide a spacer element of the type described, particularly for installation in an oil ring assembly, which has increased oil drainage space whereby a free circulation of oil through the assembly to the interior of the piston is made possible.

Sixth, to provide a spacer of the type described which is formed of a ductile metal so as to be extremely resistant to breaking in handling or installation.

Objects relating to details and economies of the invention will appear from the description to follow. The invention is defined and pointed out in the claims.

Preferred embodiments of the invention are illustrated in the accompanying drawing, in which:

Fig. 1 is a fragmentary view in vertical section illustrating a piston ring assembly in accordance with my invention in operative position in a groove, the size of the parts being exaggerated and no attempt having been made to maintain the exact relative proportions.

Fig. 2 is a perspective view illustrating the now preferred embodiment of the improved spacer constituting the subject matter of the present invention.

Fig. 3 is a fragmentary view in horizontal section illustrating details of construction of the spacer element of Fig. 2.

Fig. 4 is a fragmentary perspective view illustrating a modified embodiment of a spacer element suited for an assembly similar to that of Fig. 1 in accordance with my invention.

Figs. 5 and 6, inclusive, are views in vertical section illustrating still further modified embodiments of the spacer element according to my invention, all of which are designed for use in an assembly similar to that illustrated in Fig. 1, it being deemed unnecessary to particularly illustrate the coacting elements of the assembly in each case since the relation of the spacer thereto is the same as that disclosed in Fig. 1.

The present invention relates to improvements in the piston ring assembly shown and described in my Patent No. 2,148,997, dated February 28, 1939, embodying a plurality of thin, ribbon-like steel cylinder wall engaging elements and a spacer disposed therebetween and maintaining the same in axially spaced relation in a piston groove. In particular, the present invention relates to details of construction of the spacer element. In my aforesaid patent, the spacer element was illustrated and described as preferably formed of cast iron having ventilating notches machined therein. However, in notching or slotting such a cast iron element, particularly for installation in an oil ring assembly, it has been found that the width of the notch capable of being formed is rather limited, in fact to about one-half of the total width of the spacer. If a larger drainage slot than this is provided, the result is that the relatively brittle cast iron is rendered entirely too fragile, with resultant likelihood of breaking in handling, shipping, or installation. In the present case, a spacer is employed which enables larger drainage slots to be utilized, with resultant freer flowage of oil through the assembly, without objectionably weakening the article. Moreover, these results are accomplished without objectionably increasing the expense of production of the element.

Referring to Fig. 1, the reference numeral 1 indicates a cylinder, for example, of an internal combustion engine, having a piston 2 reciprocable therein. This piston is provided with a groove or grooves 3 adapted to receive the assembly 4 of the invention.

In the embodiment illustrated in Fig. 1, the structure is an oil ring assembly and consists of a pair of thin, ribbon-like split steel cylinder wall engaging elements 5 disposed for radial thrust engagement with the cylinder wall and axially spaced in the groove 3 by the spacer element 6 of the invention. The wall engaging elements are urged radially in addition to their inherent radial expansive action by an expander spring 7 of suitable construction, this expander having portions thereof engageable with the wall engaging element 6 and further portions engageable with the bottom of the groove 3 in a manner understood by those skilled in the art.

The expansible split spacer 6 illustrated in Figs. 1 to 3 is formed of steel, brass, or other ductile metal, rolled and formed into an angled or L shape to provide an annular radially disposed cylinder wall engaging arm or flange 8 and an annular axially disposed supporting or spacing web or flange 9 integral therewith. The overall axial dimension of the thus formed element 10 corresponds to the desired axial spacing of the wall engaging elements 5.

The flange 9 is provided with a plurality of angular outwardly offset tongue-like portions 11 which in effect increase the width of the angularly disposed flange 9 and coact therewith to prevent tilting of the spacer and also of the side member 5. These struck-out tongue portions also provide oil drainage openings through the spacer element so that the oil collected between the members is delivered into the bottom of the piston ring groove and through the drainage openings 10. The axial dimensions of these may vary, but I find it quite practical to make the same equal to the space between the lower side of flange 8 and the upper side of the lowermost wall engaging element 5, i. e., practically an entire height of the spacer. This provides a drainage opening through the spacer which is of greatly increased height and size compared to the drainage openings which it is possible to form in a cast iron spacer element without seriously weakening the same.

As illustrated in Figs. 2 and 3, the tongues 11 are offset outwardly in an angular direction for a portion of their length indicated by the reference numeral 12, then are again offset parallel to the circumference of the spacer by a portion designated 13. This provides an angled configuration for the tongues 11 furnishing an amply stable support to maintain the spacer in proper upstanding position in the groove, preventing tilting and at the same time effectively maintaining wall engaging elements 5 in parallel spaced relation. Some such additional supporting provision must be incorporated in the spacer, since the material is relatively thin, for example, from .020 to .030 inch thickness, and, unaided, incapable of maintaining the spacer in proper position.

It will be apparent from the foregoing that the exact conformation of the strip metal spacer may be altered and still provide the adequate spacing of the wall engaging members and the requisite area of oil drainage opening.

In Fig. 4, I illustrate a spacer formed of the L-shaped or angled construction similar to that of Fig. 1, to provide the wall engaging and centering flange 18, while the radial drainage openings 19 are provided by slitting and offsetting vertical or axially extending fingers or tongues 20 from the depending flange 21 in the manner illustrated, the tongues being bent along their integral line of correction with the flange 18. Obviously, the area of the opening can be regulated as desired, by offsetting the tongues more or less, an advantage which also characterizes the embodiment of Figs. 1 to 3.

The embodiment of Fig. 5 is generally similar to that of Fig. 4, but differs therefrom in that alternate tongues 25, 26 are struck out equal amounts in opposite directions relative to the inner periphery edge of the cylinder wall engaging shoulder 27. This enables the spacer to be provided with a stable support and uses a slightly less width of metal than the construction of Fig. 4.

In Fig. 6, I illustrate a further refinement in the shape illustrated in Fig. 5, wherein the metal is sharply folded or bent on itself at 28, then provided with the downwardly extending fingers or tongues 29, 30 offset alternately in opposite directions from a vertical plane between the same. This places the support for the element between the inner and outer peripheries of shoulder or flange 301, with resultant still greater stability.

It should be understood that in each of the embodiments of spacer in Figs. 4, 5 and 6 I contemplate that the same is to be employed in association with cylinder wall engaging elements 5 such as those illustrated in Fig. 1. The resultant structure is one in which the oil drainage or ventilating characteristics are improved and the danger of breakage in handling, shipping, and assembly is eliminated, since in all cases the spacer is formed from a ductile metal such as steel, brass, and the like.

Within the purview of this invention, the annular wall engaging and centering flanges of the various embodiments of the invention may exert scraping or sealing action on the cylinder wall by reason of their inherent spring tension or relying on further expanding means applied thereto in a well known fashion to produce augmented and independent action similar to that exerted by elements 5.

I am aware that the oil drainage recesses and supports for the spacer elements could be formed by still further provisions than I have described, but I consider any means whereby a stable support for the spacer between a pair of cylinder wall engaging elements is provided to come within the scope of this invention, which concerns a spacer of a thin split ductile metal construction bent or folded as desired to afford adequate spacing action for certain elements of a piston ring assembly.

In the foregoing description, reference has been made to use of the spacer in an oil ring installation. However, it will be apparent to those skilled in the art that a strip metal spacer element in accordance with any of the foregoing modifications has utility and value in other ring assemblies, for example, a compression ring assembly, and I desire such use to be regarded as included in the present invention.

I consider the invention to reside in the provision of a spacer element formed by simple, inexpensive operations from a single strip of ductile metal which is bent, folded, or otherwise conformed to provide a greater effective supporting engagement with at least one of the wall engaging elements 5 than the width of the strip would otherwise allow and provided with ventilating openings of ample size and with or without a wall engaging centering portion, the stock from which the spacer is formed enabling these results to be accomplished without unduly weakening the spacer element.

I have illustrated and described my improvements in embodiments which are very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A spacer for a piston ring assembly including a pair of axially spaced cylinder wall engaging segments, said spacer comprising an annular split member of thin ductile strip metal having a single annular radially extending cylinder wall engaging flange only, said flange being of substantial radial width adapted for side by side supporting engagement with the axially uppermost of said segments, and an axial spacing portion including a plurality of tongues integral with and depending from the inner radial edge of said flange, said tongues being radially spaced relative to one another at their free ends remote from the flange to provide drainage openings of substantial size therebetween and being adapted to engage the other segment at said ends to provide a stable support for the member thereon.

2. A spacer for a piston ring assembly including a pair of axially spaced cylinder wall engaging segments, said spacer comprising an annular split member of thin ductile strip metal having a single annular radially extending wall engaging flange only, said flange being of substantial radial width adapted for side by side supporting engagement with one of the segments, and an axial spacing portion including a plurality of tongues integral with and depending from said flange, said tongues being radially spaced relative to one another at their free ends remote from the flange to provide drainage openings of substantial size therebetween and being adapted to engage the other segment at said ends to provide a stable support for the member thereon.

3. A spacer for a pair of cylinder wall engaging segments, comprising an annular split member of thin ductile strip metal having an annular radially extending flange adapted for supporting engagement with one of said segments, and axial spacing means integral with and extending axially from the inner radial edge of said flange, including radially extending tongues extending beneath said flange, and further axially extending portions terminating in radially spaced relation to the ends of said tongues, said portions and tongues having exposed edges at the same axial side thereof adapted to supportingly engage the other segment.

4. A spacer for a pair of thin cylinder wall engaging segments, comprising an annular split member of thin ductile strip metal having an annular radially extending flange adapted for supporting engagement with one of said segments, and axial spacing means integrally connected to said flange, including axially extending portions and radially inclined spacer portions terminating at points spaced radially from the first named portions, said respective portions having exposed edges on the same axial side thereof adapted to supportingly engage the other segment.

5. A spacer of the type described comprising an annular split member of thin ductile strip metal having an annular radially extending flange of substantial radial width and an axial spacing portion including a plurality of tongues integral with and depending from the inner radial edge of said flange, said tongues terminating in free ends radially spaced relative to one another to provide drainage openings of substantial size therebetween and adapted to provide a stable support for the spacer on a surface engaged thereby.

6. A spacer of the type described comprising an annular split member of thin ductile strip metal having an annular radially extending flange of substantial radial width and axial spacing means integral with said flange, including a set of axially directed members and a set of radially inclined tongues, said members and tongues terminating at points radially spaced relative to one another and having exposed edges at the same axial side thereof adapted to provide a stable support for the spacer on a surface engaged thereby.

7. A spacer of the type described, comprising an annular split member of thin ductile strip metal having an annular radially extending cylinder wall engaging flange, and axial spacing means integrally connected to said flange, including axial spacing portions and tongues extending radially relative to said portions and terminating in radially spaced relation thereto, said portions and tongues having substantially coplanar exposed edges at one axial side thereof adapted for engagement with an adjacent surface.

HAROLD P. PHILLIPS.